(12) United States Patent
Duge et al.

(10) Patent No.: US 10,805,005 B2
(45) Date of Patent: Oct. 13, 2020

(54) FREQUENCY SPECTRUM SYSTEM SECURITY

(71) Applicants: Rolls-Royce Corporation, Indianapolis, IN (US); Rolls-Royce North American Technologies, Inc., Indianapolis, IN (US)

(72) Inventors: Robert T. Duge, Carmel, IN (US); Richard Joseph Skertic, Carmel, IN (US)

(73) Assignees: Rolls-Royce Corporation, Indianapolis, IN (US); Rolls-Royce North America Technologies, Inc., Indianapolis, IN (US)

( * ) Notice: Subject to any disclaimer, the term of this patent is extended or adjusted under 35 U.S.C. 154(b) by 0 days.

(21) Appl. No.: 16/193,322

(22) Filed: Nov. 16, 2018

(65) Prior Publication Data
US 2020/0162154 A1   May 21, 2020

(51) Int. Cl.
| H04B 10/85 | (2013.01) |
| H04B 10/079 | (2013.01) |
| H04B 10/516 | (2013.01) |

(52) U.S. Cl.
CPC ... *H04B 10/07957* (2013.01); *H04B 10/5161* (2013.01); *H04B 10/85* (2013.01); *H04B 2210/006* (2013.01)

(58) Field of Classification Search
CPC combination set(s) only.
See application file for complete search history.

(56) References Cited

U.S. PATENT DOCUMENTS

| 4,965,856 | A | 10/1990 | Swanic |
| 5,808,761 | A | 9/1998 | Stewart |
| 6,002,331 | A | 12/1999 | Laor |
| 6,137,780 | A | 10/2000 | Darcie et al. |
| 6,574,016 | B1 | 6/2003 | Harley et al. |
| 7,062,177 | B1 | 6/2006 | Grivna et al. |
| 7,359,634 | B1 | 4/2008 | Meli |
| 8,000,601 | B2 | 8/2011 | Schofield et al. |
| 8,811,825 | B2 | 8/2014 | Walewski |
| 9,954,609 | B2 | 4/2018 | Murphy et al. |
| 2002/0097469 | A1* | 7/2002 | Yee ................. H04B 10/61 398/76 |
| 2004/0190905 | A1* | 9/2004 | Kano ............. H04J 14/0227 398/141 |
| 2006/0110161 | A1 | 5/2006 | Cho et al. |

(Continued)

OTHER PUBLICATIONS

Extended European Search Report from counterpart EP Application No. 19204627.4 dated Mar. 25, 2020, 6 pgs.

*Primary Examiner* — Omar S Ismail
(74) *Attorney, Agent, or Firm* — Shumaker & Sieffert, P.A.

(57) ABSTRACT

A system may include a receiver configured to receive a communications signal from a transmitter and processing circuitry configured to: determine at least one frequency characteristic of the communications signal and compare the at least one frequency characteristic to at least one verified frequency characteristic stored by a memory associated with the processing circuitry to determine whether the transmitter is a verified transmitter. In some examples, the transmitter, receiver and communications signal are an optical transmitter, and optical receiver, and an optical signal, respectively.

16 Claims, 4 Drawing Sheets

(56) References Cited

U.S. PATENT DOCUMENTS

| | | | |
|---|---|---|---|
| 2006/0291868 A1* | 12/2006 | Yee | H04B 10/50 |
| | | | 398/152 |
| 2008/0218323 A1* | 9/2008 | Lesesky | G07C 5/085 |
| | | | 340/431 |
| 2009/0169213 A1* | 7/2009 | Lowery | H04B 10/548 |
| | | | 398/98 |
| 2009/0202241 A1* | 8/2009 | Yu | H04J 14/0279 |
| | | | 398/58 |
| 2014/0219662 A1* | 8/2014 | Hironishi | H04J 14/021 |
| | | | 398/79 |
| 2016/0124071 A1 | 5/2016 | Baxley et al. | |
| 2016/0178464 A1 | 6/2016 | Burns et al. | |
| 2017/0164077 A1 | 6/2017 | Goodrum et al. | |
| 2018/0269984 A1* | 9/2018 | Salsi | H04B 10/616 |

\* cited by examiner

FREQUENCY SPECTRUM SYSTEM SECURITY

TECHNICAL FIELD

The disclosure relates to optical systems and security features for frequency-based communications systems.

BACKGROUND

Embedded electrical and computing systems are used in many applications, including manned and unmanned vehicle control systems, as well as other types of control systems. For instance, flight control systems, engine control systems, generator control systems, and the like, are examples of embedded electrical and computing systems. These types of embedded systems may be exposed, during regular operational use, to a variety of different types of hostile cyberattacks. For example, an unauthorized user may try to circumvent access controls to take command of an engine control system of an aircraft, e.g., to induce damage to the engine, or worse, crash the aircraft.

SUMMARY

In one example, the disclosure is directed to a method including: receiving, by a receiver, from a transmitter, a communications signal; determining, by processing circuitry, at least one frequency characteristic of the communications signal; and determining, by the processing circuitry, whether the transmitter is a verified transmitter based on the at least one frequency characteristic and at least one verified frequency characteristic stored by a memory associated with the processing circuitry.

In another example, the disclosure is directed to a system including: a receiver configured to receive a communications signal from a transmitter; and processing circuitry configured to: determine at least one frequency characteristic of the communications signal; and determine whether the transmitter is a verified transmitter based on the at least one frequency characteristic and at least one verified frequency characteristic stored by a memory associated with the processing circuitry.

The details of one or more examples are set forth in the accompanying drawings and the description below. Other features, objects, and advantages of the disclosure will be apparent from the description and drawings, and from the claims.

DETAILED DESCRIPTION

Figure 1:
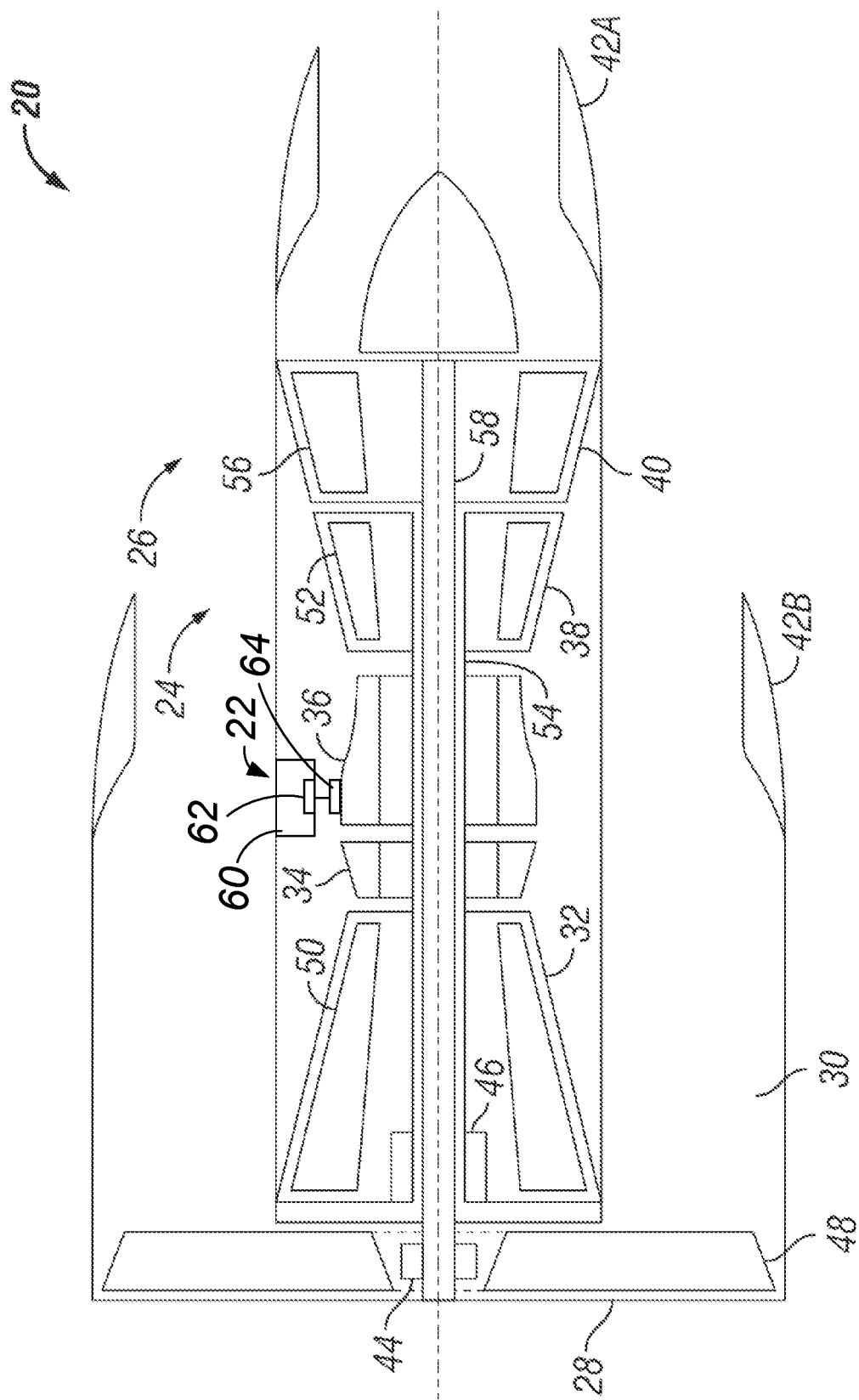
FIG. 1 is a conceptual diagram illustrating an example gas turbine engine that includes an optical system, in accordance with one or more aspects of the present disclosure.

The disclosure describes frequency spectrum-based communications systems including a receiver and a transmitter that are keyed to each other using information based on at least one frequency characteristic of the transmitter. In some examples, the frequency spectrum-based communications system may be an optical communications system. In other examples, the frequency spectrum-based communications system may be a radio frequency (RF) communications system. The transmitter outputs a communications signal, such as a pulse train, to transmit data from the transmitter to the receiver. The transmitter outputs the communications signal as electromagnetic energy with a predetermined frequency spectrum. While the transmitter may be associated with a nominal carrier frequency, the actual communications signal emitted by the transmitter may be unique to the specific transmitter when analyzed with sufficient precision. For example, the actual carrier frequency of the communications signal emitted by the transmitter may be different from the nominal carrier frequency and unique to the transmitter when determined to a sufficient level of precision. As another example, the frequency of a phase modulation sideband may be unique to the transmitter when determined to a sufficient level of precision.

By determining at least one frequency characteristic of a transmitter, a security key may be generated. The security key may be stored in a memory associated with a corresponding receiver to which the transmitter is communicatively coupled, e.g., during manufacture or installation of the communication system. The security key (the at least one frequency characteristic of the optical transmitter) may identify a verified transmitter. During use, processing circuitry associated with the receiver may determine at least one frequency characteristic of a received communications signal. The processing circuitry may determine whether the received communications signal was output by the verified transmitter based on the at least one frequency characteristic of the received communications signal and the stored at least one frequency characteristic associated with the verified transmitter determine whether the received communications signal was output by the verified transmitter. In this way, the receiver and associated processing circuitry may verify integrity of the communications link between the transmitter and receiver, reducing a likelihood of success of intrusion in the system by attackers. This may be particularly applicable to embedded electrical and computing systems, such as those used in flight control systems, engine control systems, generator control systems, and the like.

The following examples will be described with primary reference to an optical communication system in which the transmitter and receiver are an optical transmitter and an optical receiver, and the communication coupling between the transmitter and receiver is an optical connection, such as a fiber optic cable. It will be understood, however, that the systems and techniques described herein may be applied to other frequency-based communications systems, such as, for example RF communication systems.

FIG. 1 is a conceptual diagram illustrating an example gas turbine engine 20 that includes an optical system 22, in accordance with one or more aspects of the present disclosure. Gas turbine engine 20 is a primary propulsion engine that provides thrust for flight operations of a vehicle, such as an aircraft, marine craft, or the like. In some examples, gas turbine engine 20 is a two-spool engine having a high pressure (HP) spool 24 and a low pressure (LP) spool 26. In other examples, gas turbine engine 20 may include three or more spools, e.g., may include an intermediate pressure (IP) spool and/or other spools. In some examples, gas turbine engine 20 is a turbofan engine, wherein LP spool 26 is operative to drive a propulsor in the form of a turbofan (fan)

system 28. In other examples, gas turbine engine 20 may not include a LP spool or fan system 28. In some examples, gas turbine engine 20 may include any suitable turbine powered-engine propulsion system, including but not limited to, a turbojet engine or a turboprop engine.

Gas turbine engine 20 includes a fan system 28 in fluid communication with a bypass duct 30 and a compressor system 32. A diffuser 34 is in fluid communication with compressor system 32. A combustion system 36 is fluidically disposed between compressor system 32 and a high pressure (HP) turbine system 38 (e.g., disposed between compressor system 32 and HP turbine system 38 such that air or another fluid may flow from compressor system 32 to combustion system 36 to HP turbine system 38). In some examples, combustion system 36 includes a combustion liner (not shown) that encloses a continuous combustion process. In other examples, combustion system 36 may take other forms, and may be, for example, a wave rotor combustion system, a rotary valve combustion system, a pulse detonation combustion system, or a slinger combustion system, and may employ deflagration and/or detonation combustion processes. A low pressure (LP) turbine system 40 is fluidically disposed between HP turbine system 38 and a nozzle 42A configured to discharge a core flow of gas turbine engine 20 (e.g., disposed between HP turbine system 38 and nozzle 42A such that air or another fluid may flow from HP turbine system 38 to LP turbine system 40 to nozzle 42A). A nozzle 42B is in fluid communication with bypass duct 30, and operative to transmit a bypass flow generated by fan system 28 around the core of gas turbine engine 20. In other examples, other nozzle arrangements may be used, e.g., a common nozzle for core and bypass flow; a nozzle for core flow, but no nozzle for bypass flow; or another nozzle arrangement.

Fan system 28 includes a fan rotor system 48 having one or more rotors (not shown) that are driven by LP spool 26 of LP turbine system 40. Fan system 28 may include one or more vanes (not shown). Compressor system 32 includes a compressor rotor system 50. In some examples, compressor rotor system 50 includes one or more rotors (not shown) that are powered by HP turbine system 38. High pressure turbine system 38 includes a first turbine rotor system 52. First turbine rotor system 52 includes one or more rotors (not shown) operative to drive compressor rotor system 50. First turbine rotor system 52 is drivingly coupled to compressor rotor system 50 via a shafting system 54. Low pressure turbine system 40 includes a second turbine rotor system 56. Second turbine rotor system 56 includes one or more rotors (not shown) operative to drive fan rotor system 48. Second turbine rotor system 56 is drivingly coupled to fan rotor system 48 via a shafting system 58. Shafting systems 54 and 58 include a plurality of shafts that may rotate at the same or different speeds and directions. In some examples, only a single shaft may be employed in one or both of shafting systems 54 and 58. Turbine system 40 is operative to discharge the engine 20 core flow to nozzle 42A.

During normal operation of gas turbine engine 20, air is drawn into the inlet of fan system 28 and pressurized by fan rotor system 48. Some of the air pressurized by fan rotor system 48 is directed into compressor system 32 as core flow, and some of the pressurized air is directed into bypass duct 30 as bypass flow. Compressor system 32 further pressurizes the portion of the air received therein from fan system 28, which is then discharged into diffuser 34. Diffuser 34 reduces the velocity of the pressurized air and directs the diffused core airflow into combustion system 36. Fuel is mixed with the pressurized air in combustion system 36, which is then combusted. The hot gases exiting combustion system 36 are directed into turbine systems 38 and 40, which extract energy in the form of mechanical shaft power to drive compressor system 32 and fan system 28 via respective shafting systems 54 and 58.

In some examples, engine 20 may include an electrical machine 44 coupled to LP spool 26, an electrical machine 46 coupled to HP spool 24, or both. Electrical machine 44 and electrical machine 46 may be configured to provide electrical power to aircraft 10 during flight operations, during ground operations, or both. In some examples, each of electrical machines 44 and 46 are configured to convert mechanical power to electrical power and to convert electrical power to mechanical power, e.g., as in a motor/generator. In some examples, one or both of electrical machines 44 and 46 may be configured to only convert mechanical power into electrical power, e.g., as in a generator. In some examples, one or both of electrical machines 44 and 46 may be configured to only convert electrical power into mechanical power, e.g., as in a motor. In some examples, aircraft 10 may include other electrical systems including, for example, one or more of high heat load electrical systems, electrical power distribution systems, power conversion systems, power electronics, digital electronics, and environmental control systems.

Optical system 22 of gas turbine engine 20 includes a first component 60 and a second component 62. First component 60 and second component are optically coupled by an optical interface, such as a fiber optic cable (not labelled in FIG. 1). First component 60 may be a central component, such as a controller. Second component 64 may include a remote component, such as a sensor (e.g., temperature, pressure, position, speed, rotational frequency, or the like) or an actuator (e.g., a valve actuator, a linear or rotational actuator, or the like). In this way, optical system 22 may be part or substantially all of a control system for gas turbine engine 20.

Although optical system 22 is illustrated in the context of gas turbine engine 20 in FIG. 1, optical system 22 may be used in any optical-communications based system, including other control system, networking systems, and the like.

First component 60 includes an optical transceiver 62. Optical transceiver 62 may include an optical transmitter and an optical receiver. Alternatively, first component 60 may include separate optical transmitter and optical receiver. Similarly, second component 64 may include an optical transceiver or an optical transmitter and optical receiver.

The optical transmitter may include any light source configured to output light with a selected frequency spectrum. In some examples, the optical transmitter may include a light emitting diode (LED), a vertical cavity surface emitting laser (VCSEL), or the like. In other examples, the optical transmitter may include a plurality of LEDs or VCSELs, each LED or VCSEL outputting light with a different frequency spectrum.

The optical receiver may include any photo detector configured to sense light and produce an electrical signal representative of the sensed light. For example, the optical receiver may include a photodiode or the like.

Although not shown in FIG. 1, each of first component 60 and second component 64 may also include processing circuitry configured to process the electrical signal indicative of the sensed light and to generate electrical signals that the optical transmitter converts to optical signals and outputs.

In accordance with aspects of this disclosure, at least one optical characteristic of at least one of the optical transmitters may be characterized at the time of manufacture of the optical transmitter or at the time of installation of the optical transmitter in optical system 22 or gas turbine engine 20. For example, at least one optical characteristic of the optical transmitter of first component 60 may be characterized. The at least one optical characteristic may include, for example, an actual carrier frequency of the optical signal output by the optical transmitter. Although an optical transmitter may be assigned a nominal carrier frequency that generally describes an approximate center frequency of the light output by the optical transmitter, manufacturing variations may result in the actual carrier frequency varying from the nominal carrier frequency when analyzed with sufficient precision. Manufacturing variations may result in the actual carrier frequency being substantially unique to the respective optical transmitter.

As another example, the at least one optical characteristic may include a phase modulation sideband frequency. Like the actual carrier frequency, the phase modulation sideband frequency may be substantially unique to the respective optical transmitter when analyzed with sufficient precision due to manufacturing variations. As other examples, the at least one optical characteristic may include an amplitude of the optical signal at an actual carrier frequency of the optical signal or an amplitude of the optical signal at a phase modulation sideband frequency.

The at least one optical characteristic of the optical transmitter may be stored in a memory associated with the optical receiver to which the optical transmitter is optically coupled. For example, if the characterized optical transmitter is part of optical transceiver 62 of first component 60, the at least one optical characteristic of the optical transmitter may be stored in a memory associated with the optical receiver of second component 64. During operation of optical system 22, second component 64 may be configured to analyze optical signals received from first component 60, identify at least one optical characteristic of the received optical signal, and compare the at least one optical characteristic of the received optical signal to the stored at least one optical characteristic associated with the originally-installed optical transmitter of first component 60. In response to the at least one optical characteristic of the received optical signal being substantially the same (e.g., the same or the same within a predetermined threshold amount) as the at least one optical characteristic associated with the originally installed optical transmitter, second component 64 may determine that optical system 22 (or at least the optical transmitter of first component 60 and the optical link between the optical transmitter of first component 60 and the optical receiver of second component 64) is intact and the optical signal is genuine. Second component 64 may proceed to use the data contained in the optical signal. On the other hand, in response to the at least one optical characteristic of the received optical signal not being substantially the same (e.g., not the same or not the same within a predetermined threshold amount) as the at least one optical characteristic associated with the originally installed optical transmitter, second component 64 may determine that optical system 22 (or that at least one of the optical transmitter of first component 60 or the optical link between the optical transmitter of first component 60 and the optical receiver of second component 64) is not intact. Second component 64 may proceed to discard or not use the data contained in the optical signal. In some examples, second component 64 additionally may communicate an indication that optical system 22 (or that at least one of the optical transmitter of first component 60 or the optical link between the optical transmitter of first component 60 and the optical receiver of second component 64) is not intact.

Although the characterization and storing of at least one optical characteristic has been described in only one direction (from first component 60 to second component 64), this technique may be used bi-directionally (e.g., from first component 60 to second component 64 and from second component 64 to first component 60).

In this way, by characterizing the optical signal output by a specific optical transmitter when manufacturing the optical transmitter or installing the optical transmitter in optical system 22 and storing the at least one optical characteristic in a memory associated with an optical receiver optically coupled to the optical transmitter, the optical receiver may detect data originating from devices other than the optical transmitter. This may increase security of optical system 22 and reduce a likelihood of successful attacks on optical system 22 using man-in-the-middle attacks or replacement of an optical transmitter.

Figure 2:
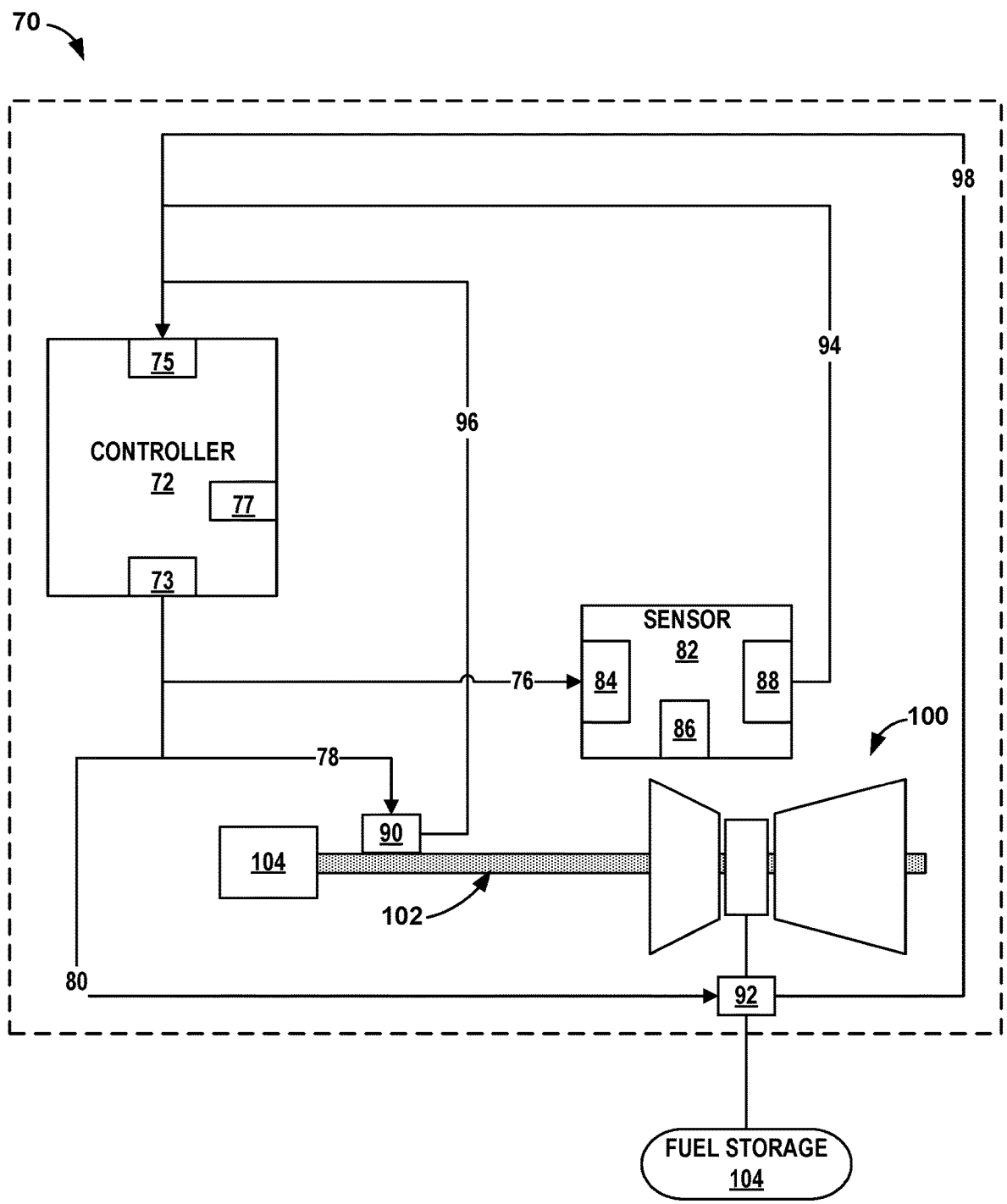
FIG. 2 is a conceptual diagram illustrating an example optical system, in accordance with one or more aspects of the present disclosure.

FIG. 2 is a conceptual diagram illustrating an example optical system 70, in accordance with one or more aspects of the present disclosure. Optical system 70 is an example of optical system 22 of FIG. 1. Optical system 70 includes a controller 72, a first sensor 82, a second sensor 90, and an actuator 92. Controller 72 includes an optical transmitter 73, an optical receiver 75, and processing circuitry 77. First sensor 82 includes an optical receiver 84, processing circuitry 86, and an optical transmitter 88. Second sensor 90 and actuator 92 similarly include a respective optical receiver, processing circuitry, and optical transmitter, although these components are not illustrated in FIG. 2 for clarity.

Optical transmitter 73 of controller 72 is optically coupled to optical receiver 84 of first sensor 82 by first optical connection 76. Optical transmitter 73 of controller 72 is optically coupled to the optical receiver of second sensor 90 by second optical connection 78. Optical transmitter 73 of controller 72 is optically coupled to the optical receiver of actuator 92 by third optical connection 80. Although optical transmitter 73 is shown as a single optical transmitter, in other examples, controller 72 may include a separate optical transmitter for each optical connection, e.g., a separate optical transmitter for each of first optical connection 76, second optical connection 78, and third optical connection 80. Like the optical transmitters described in FIG. 1, optical transmitter 73 may include any suitable device configured to output an optical signal with a predetermined frequency spectrum, such as an LED or a VCSEL.

Optical receiver 75 of controller 72 is optically coupled to optical transmitter 88 of first sensor 82 via fourth optical connection 94. Similarly, optical receiver of controller 72 is optically coupled to the optical transmitters of second sensor 90 and actuator 92 via fifth optical connection 96 and sixth optical connection 98, respectively. In other examples, rather than the optical connections for the send (optical transmitters) and receive (optical receivers) channels being separate optical connections, the send and receive channels for each respective device pair may be accomplished using a single optical connection. For example, a single optical connection may optically couple controller 72 and first sensor 82. Alternatively, rather than a single optical connection optically connecting a transmit/receive pair, a transmit/receive pair may be optically coupled using a plurality of optical connections. Each optical connection may include a fiber optic cable. The plurality of optical connections, if present, may be accomplished using separate fiber optical cables or separate modes of a multimode fiber.

Controller 72 may include processing circuitry 77, a memory, and input/output hardware, including optical transmitter 73 and optical receiver 75. Examples of processing circuitry 77 may include any one or more of a microcontroller (MCU), e.g., a computer on a single integrated circuit containing a processor core, memory, and programmable input/output peripheral; a microprocessor (μP); e.g. a central processing unit (CPU) on a single integrated circuit (IC); a digital signal processor (DSP); an application specific integrated circuit (ASIC); a field-programmable gate array (FPGA); a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry. In some examples, controller 72 and/or processing circuitry may include an engine control unit (ECU) or a full authority digital engine control (FADEC).

Processing circuitry 77 may be configured to at least one of perform the functions ascribed to controller 72; process information received from sensors 82 and 90 and actuator 92 via optical receiver 75 and optical connections 94, 96, and 82; transmit information to sensors 82 and 90 and actuator 92 via optical transmitter 73 and optical connections 76, 78, and 80; and process a received optical signal to determine at least one optical characteristic of the received optical signal and compare the at least one optical characteristic of the received optical signal to at least one optical characteristic associated with an optical transmitter of first sensor 82, second sensor 90, or actuator 92. Optical transmitter 73 may include any of the optical transmitters described herein, including an LED or a VCSEL. Optical receiver 75 may include any of the optical receivers described herein, including photodiode or the like.

First sensor 82 may include any suitable type of sensor. For examples, first sensor 82 may include a temperature sensor, a pressure sensor, a position sensor, a speed sensor, a rotational frequency sensor, an accelerometer, a gyroscope, a gas detector, a proximity sensor, or the like. First sensor 82 may include a sensor component configured to perform the sensing aspect of first sensor 82, and also may include input/output components, such as optical receiver 84 and optical transmitter 88, and processing circuitry 86. Optical transmitter 88 may include any of the optical transmitters described herein, including an LED or a VCSEL. Optical receiver 84 may include any of the optical receivers described herein, including photodiode or the like.

Processing circuitry 86 may include any one or more of a MCU, a pP, a DSP, an ASIC, a FPGA, a SoC, or equivalent discrete or integrated logic circuitry. Processing circuitry 86 may be configured to at least one of control the sensor component, process information received from the sensor component, receive and transmit data via optical receiver 84 and optical transmitter 88, respectively, and process a received optical signal to determine at least one optical characteristic of the received optical signal and compare the at least one optical characteristic of the received optical signal to at least one optical characteristic associated with optical transmitter 73 of controller 72.

Second sensor 90 may be similar to or substantially the same as first sensor 82 in that second sensor 90 may include any suitable type of sensor and may include a sensor component configured to perform the sensing aspect of second sensor 90, input/output components, such as an optical receiver and an optical transmitter, and processing circuitry. Second sensor 90 may include the same or a different type of sensor component as first sensor 82. In the example of FIG. 2, second sensor 90 may include a rotational frequency sensor configured to sense a rotational frequency or rotational speed of output shaft 102.

Actuator 92 may include any type of actuator component configured to actuate any type of component. For example, actuator 92 may include a hydraulic actuator, a pneumatic actuator, an electric actuator, or a mechanical actuator. Actuator 92 may be configured to actuate any type of component, such as a valve, a flap, a vane, a nozzle, (e.g., a valve actuator, a linear or rotational actuator, or the like). Like sensors 82 and 90, actuator 92 may include processing circuitry, an optical transmitter, an optical receiver.

Optical system 70 is illustrated in FIG. 2 in the context of a gas turbine engine system, which includes a gas turbine engine 100 coupled to an output shaft 102, which drives a machine 104, such as a propulsor. Gas turbine engine 100 receives fuel from fuel storage 104 via actuator 92 (e.g., a valve). However, optical system 70 may be used in any other context in which two devices communicate using optical signals over optical connections.

As described above with respect to FIG. 1, at least one component of optical system 70 (e.g., controller 72, first sensor 82, second sensor 90, or actuator 92) may store at least one optical characteristic of at least one optical transmitter that transmits optical signals to the component and use the at least one optical characteristic to verify integrity of received optical signals. The following example will be described with reference to controller 72 and first sensor 82, but it will be understood that similar techniques may be applied by in the reverse direction between controller 72 and first sensor 82, by second sensor 90 and/or actuator 92, or combinations thereof. Further, the following example will be described with respect to FIG. 3, which is a flow diagram illustrating example operations performed by optical system 70, in accordance with one or more aspects of the present disclosure. The techniques of FIG. 3 may be performed by optical systems including more or fewer components than are shown in FIG. 2.

Figure 3:
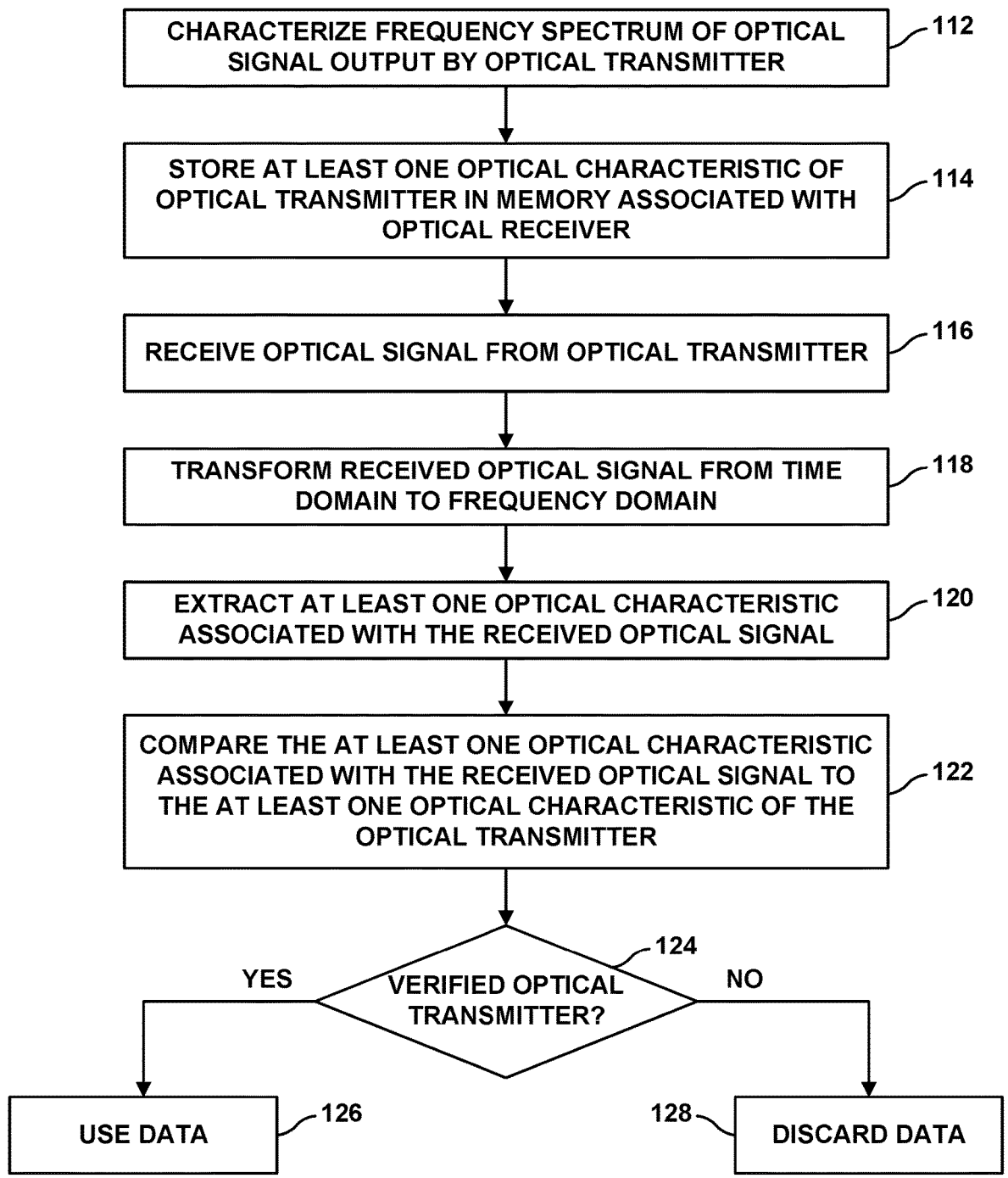
FIG. 3 is a flow diagram illustrating example operations performed by an example optical system that includes an optical receiver and processing circuitry, in accordance with one or more aspects of the present disclosure.

The technique of FIG. 3 includes characterizing the frequency spectrum of an optical signal output by optical transmitter 73 (112). In some examples, the frequency spectrum of the optical signal output by optical transmitter 73 may be characterized at the time of manufacture of optical transmitter 73 or at the time of installation of optical transmitter 73 in optical system 22 or gas turbine engine 20. For example, at least one optical characteristic of the optical transmitter of first component 60 may be characterized.

Figure 4:
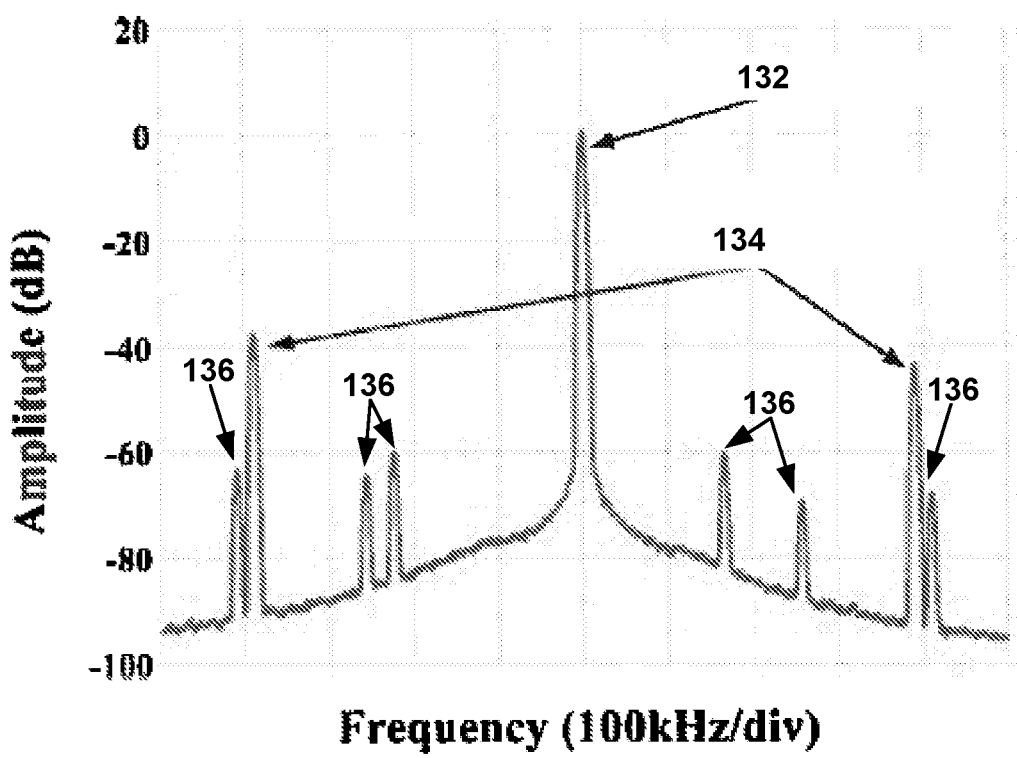
FIG. 4 is a diagram illustrating an example light emitting diode emission spectrum.

The at least one optical characteristic of the optical transmitter may be characterized by detecting the output optical signal, e.g., using a photodetector, and transforming the electrical signal output by the photodetector, which is representative of the optical signal, from the time domain to the frequency domain. For example, processing circuitry (such as processing circuitry 86, although other processing circuitry may be used) may apply a Fourier Transform, Laplace transform, Z-transform, or other mathematical algorithm to transform the electrical signal representative of the optical signal from the time domain to a frequency domain. FIG. 4 is a diagram illustrating an example LED emission spectrum in a frequency domain.

The processing circuitry then may analyze the frequency domain representation of the electrical signal representative of the optical signal to identify at least one optical characteristic. The at least one optical characteristic may include, for example, an actual carrier frequency 132 of the optical signal output by optical transmitter 73. As described above, although optical transmitter 73 may be labelled or assigned a nominal carrier frequency that generally describes an approximate center frequency of the light output by optical transmitter 73, manufacturing variations may result in the actual carrier frequency 132 varying from the nominal carrier frequency when analyzed with sufficient precision. Manufacturing variations may result in the actual carrier frequency 132 being substantially unique to optical transmitter 73.

As another example, the at least one optical characteristic may include a phase modulation sideband frequency or frequencies 134. Like the actual carrier frequency 132, the phase modulation sideband frequency or frequencies 134 may be substantially unique to optical transmitter 73 when analyzed with sufficient precision due to manufacturing variations. As other examples, the at least one optical characteristic may include an amplitude of the optical signal at an actual carrier frequency 132 of the optical signal or an amplitude of the optical signal at a phase modulation sideband frequency or frequencies 134. Although the at least one optical characteristic is generally described herein as a frequency, the at least one optical characteristic alternatively may be determined as a wavelength.

In some examples, the at least one optical characteristic may include multiple, different frequencies to more fully define the optical signal output by optical transmitter 73. For example, the at least one optical characteristic may include an actual carrier frequency 132 and a phase modulation sideband frequency or frequencies 134, and optionally may include additional frequencies, such as any frequencies having an amplitude above a threshold value. For example, additional frequencies 136 may be included in the at least one optical characteristic to more fully characterize the optical signal output by optical transmitter 73.

In some examples, as described with reference to FIG. 2, controller 72 and first sensor 80 may be connected by multiple optical connections or a multimode optical connection so that optical receiver 84 (either one or multiple optical receivers) receive a plurality of optical signals from optical transmitter 73 (either one or multiple optical transmitters). In some such examples, the at least one optical characteristic may include a beat of two or more optical signals (e.g., a frequency of constructive interference between the two or more optical signals).

The at least one optical characteristic of optical transmitter may be stored in a memory associated with optical receiver 84 to which optical transmitter 73 is optically coupled (114). For example, the memory may be part of processing circuitry 86. In some examples, the memory may include one or more security features to protect data stored in the memory, such as read-only setting, anti-tampering procedures, or the like.

During operation of optical system 22, first sensor 82 may be configured to analyze optical signals received from controller 72, identify at least one optical characteristic of the received optical signal, and determine whether the optical signal is from a verified optical transmitter based on the at least one optical characteristic of the received optical signal and the at least one optical characteristic associated with the originally-installed optical transmitter 73 of controller 72. For example, optical receiver 84 may receive an optical signal (116). Optical receiver 84 may convert the received optical signal to an electrical signal representative of the received optical signal. The electrical signal may be receiver from optical receiver 84 by processing circuitry 86.

Processing circuitry 86 may transform the electrical signal from the time domain to a frequency domain (118), then may extract at least one optical characteristic of the received signal from the electrical signal that is representative of the received optical signal (120). For example, processing circuitry 86 may identify an actual carrier signal frequency or wavelength, a phase modulation sideband frequency or wavelength, at least one additional frequency having an amplitude above a threshold value, a frequency of constructive interference between two received optical signals, or the like.

Processing circuitry 86 may compare the at least one optical characteristic of the received signal to the at least one optical characteristic of optical transmitter 73 stored in the memory associated with optical receiver 84 (122). In response to the at least one optical characteristic of the received optical signal being substantially the same (e.g., the same or the same within a predetermined threshold amount) as the at least one optical characteristic associated with the originally installed optical transmitter 73, processing circuitry may determine that optical system 22 (or at least the optical transmitter 73 and optical connection 76) is intact and the optical transmitter that transmitted the optical signal is verified to be optical transmitter 73 (the "YES" branch of decision block 124). First sensor 82 (e.g., processing circuitry 86) may proceed to use the data contained in the received optical signal (126).

On the other hand, in response to the at least one optical characteristic of the received optical signal not being substantially the same (e.g., not the same or not the same within a predetermined threshold amount) as the at least one optical characteristic associated with the originally installed optical transmitter 73, processing circuitry 86 may determine that optical system 22 (or at least one of the optical transmitter sending the optical signal or optical link 76) is not intact and the optical transmitter that sent the optical signal is not a verified optical transmitter (the "NO" branch of decision block (124)). First sensor 82 (e.g., processing circuitry 86) may proceed to discard or not use the data contained in the received optical signal (128). In some examples, first sensor 82 (e.g., processing circuitry 86) additionally may communicate an indication that optical system 22 (or at least one of the optical transmitter or optical link 76) is not intact. For example, processing circuitry 86 may send an indication to controller 72 using optical transmitter 88.

Although the characterization and storing of at least one optical characteristic has been described in only one direction (from controller 72 to first sensor 82), this technique may be used bi-directionally (e.g., from controller 72 to first sensor 82 and from first sensor 82 to controller 72). Additionally, this technique may be used for any pair or set of optical transmitter(s) and optical receiver(s) in optical system 70.

In this way, by characterizing the optical signal output by a specific optical transmitter when manufacturing optical transmitter 73 or installing optical transmitter 73 in optical system 70 and storing the at least one optical characteristic in a memory associated with optical receiver 84, optical receiver 84 may detect data originating from devices other than optical transmitter 73. This may increase security of optical system 70 and reduce a likelihood of successful attacks on optical system 70 using man-in-the-middle attacks or replacement of optical transmitter 73.

Clause 1. A method comprising: receiving, by a receiver, from a transmitter, a communications signal; determining, by processing circuitry, at least one frequency characteristic of the communications signal; and determining, by the processing circuitry, whether the transmitter is a verified transmitter based on the at least one frequency characteristic and at least one verified frequency characteristic stored by a memory associated with the processing circuitry.

Clause 2: The method of clause 1, wherein: the receiver comprises an optical receiver; the transmitter comprises an optical transmitter; the communications signal comprises an optical signal; and the optical signal encodes data.

Clause 3: The method of clause 1, wherein the at least one frequency characteristic comprises an actual carrier frequency of the communications signal.

Clause 4: The method of clause 1, wherein the at least one frequency characteristic comprises a phase modulation sideband frequency of the communications signal.

Clause 5: The method of clause 1, wherein the at least one frequency characteristic comprises an amplitude of the optical signal at an actual carrier frequency of the communications signal.

Clause 6: The method of clause 1, wherein the at least one frequency characteristic comprises an amplitude of the communications signal at a phase modulation sideband frequency.

Clause 7: The method of clause 1, wherein the communications signal is a first communications signal, further comprising receiving a second communications signal, and wherein determining the at least one frequency characteristic comprises determining a frequency of constructive interference between the first communications signal and the second communications signal.

Clause 8: The method of clause 1, further comprising outputting, by the processing circuitry, an indication of the whether the transmitter is a verified transmitter.

Clause 9: The method of clause 1, further comprising, in response to determining that the transmitter is not a verified transmitter, discarding data encoded in the communications signal.

Clause 10: The method of clause 1, further comprising, in response to determining that the transmitter is a verified transmitter, decoding data encoded in the communications signal.

Clause 11: A system comprising: a receiver configured to receive a communications signal from a transmitter; and processing circuitry configured to: determine at least one frequency characteristic of the communications signal; and determine whether the transmitter is a verified transmitter based on the at least one frequency characteristic and at least one verified frequency characteristic stored by a memory associated with the processing circuitry.

Clause 12: The system of clause 11, wherein: the receiver comprises an optical receiver; the transmitter comprises an optical transmitter; the communications signal comprises an optical signal; and the optical signal encodes data.

Clause 13: The system of clause 11, wherein the at least one frequency characteristic comprises an actual carrier frequency of the communications signal.

Clause 14: The system of clause 11, wherein the at least one frequency characteristic comprises a phase modulation sideband frequency of the communications signal.

Clause 15: The system of clause 11, wherein the at least one frequency characteristic comprises an amplitude of the communications signal at an actual carrier frequency of the communications signal.

Clause 16: The system of clause 11, wherein the at least one frequency characteristic comprises an amplitude of the communications signal at a phase modulation sideband frequency.

Clause 17: The system of clause 11, wherein the communications signal is a first communications signal, and wherein the processing circuitry is configured to determine the at least one frequency characteristic by determining a frequency of constructive interference between the first communications signal and a second communications signal.

Clause 18: The system of clause 11, wherein the processing circuitry is further configured to output an indication of the whether the transmitter is a verified transmitter.

Clause 19: The system of clause 11, wherein the processing circuitry is further configured to, in response to determining that the transmitter is not a verified transmitter, discard data encoded in the communications signal.

Clause 20: The system of clause 11, wherein the processing circuitry is further configured to, in response to determining that the transmitter is a verified transmitter, decode data encoded in the communications signal.

Various examples have been described. These and other examples are within the scope of the following claims.

What is claimed is:

1. A method comprising:
receiving, by a receiver, from a transmitter, a communications signal, wherein the receiver and a verified transmitter are keyed to each other based on at least one frequency characteristic of the communication signal;
determining, by processing circuitry, the at least one frequency characteristic of the communications signal as, at least in part, an amplitude in a phase modulation sideband frequency spectrum different from a frequency spectrum used to communicate the communications signal; and
determining, by the processing circuitry, whether the transmitter is the verified transmitter keyed to the receiver based on the at least one frequency characteristic and at least one verified frequency characteristic stored by a memory associated with the processing circuitry.

2. The method of claim 1, wherein:
the receiver comprises an optical receiver;
the transmitter comprises an optical transmitter;
the communications signal comprises an optical signal; and
the optical signal encodes data.

3. The method of claim 1, wherein the at least one frequency characteristic further comprises an actual carrier frequency of the communications signal.

4. The method of claim 1, wherein the at least one frequency characteristic further comprises an amplitude of the optical signal at an actual carrier frequency of the communications signal.

5. The method of claim 1,
wherein the communications signal is a first communications signal,
further comprising receiving a second communications signal, and
wherein determining the at least one frequency characteristic further comprises determining a frequency of constructive interference between the first communications signal and the second communications signal.

6. The method of claim 1, further comprising outputting, by the processing circuitry, an indication of the whether the transmitter is the verified transmitter.

7. The method of claim 1, further comprising, in response to determining that the transmitter is not the verified transmitter, discarding data encoded in the communications signal.

8. The method of claim 1, further comprising, in response to determining that the transmitter is the verified transmitter, decoding data encoded in the communications signal.

9. A system comprising:
a receiver configured to receive a communications signal from a transmitter, wherein the receiver and a verified transmitter are keyed to each other based on at least one frequency characteristic of the communication signal; and
processing circuitry configured to:
determine the at least one frequency characteristic of the communications signal as, at least in part, an amplitude in a phase modulation sideband frequency spectrum different from a frequency spectrum used to communicate the communications signal; and
determine whether the transmitter is the verified transmitter keyed to the receiver based on the at least one frequency characteristic and at least one verified frequency characteristic stored by a memory associated with the processing circuitry.

10. The system of claim 9, wherein:
the receiver comprises an optical receiver;
the transmitter comprises an optical transmitter;
the communications signal comprises an optical signal; and
the optical signal encodes data.

11. The system of claim 9, wherein the at least one frequency characteristic further comprises an actual carrier frequency of the communications signal.

12. The system of claim 9, wherein the at least one frequency characteristic further comprises an amplitude of the communications signal at an actual carrier frequency of the communications signal.

13. The system of claim 9, wherein the communications signal is a first communications signal, and wherein the processing circuitry is configured to determine the at least one frequency characteristic by also determining a frequency of constructive interference between the first communications signal and a second communications signal.

14. The system of claim 9, wherein the processing circuitry is further configured to output an indication of the whether the transmitter is the verified transmitter.

15. The system of claim 9, wherein the processing circuitry is further configured to, in response to determining that the transmitter is not the verified transmitter, discard data encoded in the communications signal.

16. The system of claim 9, wherein the processing circuitry is further configured to, in response to determining that the transmitter is the verified transmitter, decode data encoded in the communications signal.

* * * * *